United States Patent [19]

Hallberg

[11] Patent Number: 4,765,356
[45] Date of Patent: Aug. 23, 1988

[54] METHOD AND APPARATUS FOR MIXING FLUIDS

[76] Inventor: John E. Hallberg, 517 Pine Gate Rd., Peachtree City, Ga. 30269

[21] Appl. No.: 83,159

[22] Filed: Aug. 10, 1987

[51] Int. Cl.[4] .............................................. G05D 11/03
[52] U.S. Cl. ......................................... 137/7; 137/88; 137/625.17
[58] Field of Search ........................ 137/7, 88, 625.17

[56] References Cited

U.S. PATENT DOCUMENTS

| | | | |
|---|---|---|---|
| 1,949,300 | 2/1934 | Fitter | 137/625.17 |
| 4,085,766 | 4/1978 | Weigl | 137/88 |

FOREIGN PATENT DOCUMENTS

| | | | |
|---|---|---|---|
| 901918 | 6/1972 | Canada | 137/88 |

Primary Examiner—Robert G. Nilson
Attorney, Agent, or Firm—Hurt, Richardson, Garner, Todd & Cadenhead

[57] ABSTRACT

An apparatus for combining fluids having a piston assembly which controls both the flow rate and the mixture ratio. The piston assembly is carried in a housing having two inlet ports and an outlet port or mixing chamber. The housing and piston assembly also define first and second piston chambers. A first passageway permits the communication of the dominate gas port and the one piston chamber and a second passageway similarly permits the communication of the mixing chamber and the another piston chamber. The relative pressures in the first and second piston chambers influences the axial position of the piston which controls flow rate. Rotation of the piston controls mixture ratio.

16 Claims, 4 Drawing Sheets

METHOD AND APPARATUS FOR MIXING FLUIDS

BACKGROUND OF THE INVENTION

1. Field of the Invention

This invention relates to an apparatus and method for mixing fluids and is more particularly concerned with a piston operated mixer which receives fluids, for example air and propane gas, and combines them at a designated ratio. The mixer further allows the fluids to be mixed and delivered in amounts depending upon demand.

2. Description of the Prior Art

In the past, various systems have been employed for mixing air and propane gas for use as a replacement for natural gas. Such systems are described in *Handbook Butane-Propane Gases,* 4th Ed., 1962. One system uses mechanically interlocked, sliding valves which automatically open or close as demand increases or decreases, or which may be manually set. A blower or compressor draws the mixed gas from the mixing chamber and forces it through the distribution piping. The mixing apparatus, illustrated at page 267, employs a complex combination of diaphragms and piston to control flow. Other systems, similiarly described, include a venturi-mixer and an orifice meter ratio control system.

Such mixing systems are commercially available from Eclipse, Inc. and Selas Corporation of America. The Eclipse device includes two cones which control the air and propane gas quantities, respectively. This system includes a diaphragm which senses pressure imbalance and, in turn, activates a linkage that changes the respective orifice areas.

The Selas system also includes a diaphragm, which is attached to a non-rotatable piston. Gas pressure on the respective side of the diaphragm will cause the diaphragm to raise or lower, thus raising or lowering the piston and so controlling quantity of the delivered mixture. A rotatable "sleeve" surrounds the piston and can be set in various positions to accomplish a desired air/-propane ratio.

Each of the above-referenced systems are more complicated and thus believed less reliable and efficient than my device.

SUMMARY OF THE INVENTION

Briefly described, the present invention includes a housing having two inlets or inlet chambers and an outlet or mixing chamber. One inlet delivers a dominant, or flammable gas, such as propane gas, and a second inlet delivers air. The gasses are delivered to the mixing chamber, or outlet, where they are combined and delivered to the user. The quantity of the mixed gas delivered through the outlet is controlled by the axial position of a floating piston assembly. The top portion of the piston assembly and the housing define two chambers, the pressure in which influence the axial position of the piston assembly. A first passageway permits communication between the dominant gas inlet and a first, or lower, piston chamber. A second passageway permits communication between the mixing chamber and the second, or upper, piston chamber. These passageways effectively equalize the gas pressures in the respective piston chamber and the dominant gas inlet port, or the mixing chamber, as the case may be. The difference in the ratios of the gas pressure and the exposed piston area of each chamber causes the piston to move axially.

The position of the piston assembly will tend to essentially equalize, or maintain an axial position within a small range of movement, thus delivering a desired quantity of mixed gas to the user. The ratio of the two inlet gasses delivered to the mixing chamber is controlled by the rotational position of the piston. The piston assembly has a gate fixedly attached to one end which is selectively operable with the piston assembly to restrict either of the inlet ports as the piston is rotated within the housing.

Another embodiment includes an apparatus used in conjunction with the piston assembly for automatically rotating the piston assembly upon receiving an electric signal from a BTU measuring device. These apparatus are commercially available and commonly known in the art, as is further discussed herein.

In operation, the apparatus is disposed to receive two input lines which are regulated to deliver their respective gasses at essentially identical pressures. As stated, the piston assembly is either mannually or automatically rotated to determine mixed gas ratios. As the demand downstream of the outlet increases, the pressure drop in the second piston chamber causes the floating piston to rise, allowing gasses from both inlet lines to be mixed and delivered to the user. The axial movement of the piston will essentially stabilize as demand becomes uniform, thus delivering the necessary quantity of mixed gas to the user.

Accordingly, it is an object of the present invention to provide a method and apparatus for mixing fluids which is inexpensive to manufacture, durable in structure and efficient in operation.

Another object of the present invention is to provide an apparatus for mixing fluids which delivers a desired quantity of mixed gas to a user, depending upon demand.

Another object of the present invention is to provide an apparatus in which the ratio of mixed fluids can be accurately and easily controlled.

Another object of the present invention is to provide an apparatus which utilizes a minimum of moving parts and requires low maintenance.

Another object of the present invention is to provide a method for mixing fluids which accurately and efficiently delivers mixed fluids at a selected ratio and quantity.

Another object of the present invention is to provide an apparatus for mixing fluids which does not include any diaphragms.

Another object of the present invention is to provide an apparatus for mixing fluids in which the piston contained therein remains in close tolerance with the housing, while not touching the bore of the housing.

Another object of the present invention is to provide a method and apparatus for mixing fluids which do not include the temperature and design pressure restrictions as those devices of the prior art.

Another object of the present invention is to provide an apparatus for mixing fluids which does not include piston rings, but utilizes a labyrinth piston seal.

Other objects, features, and advantages of the present invention will become apparent from the following description when taken in conjuction with the accompanying drawings wherein like characters of reference designate corresponding parts throughout the several views.

DESCRIPTION OF THE PREFERRED EMBODIMENTS

Figure 1:
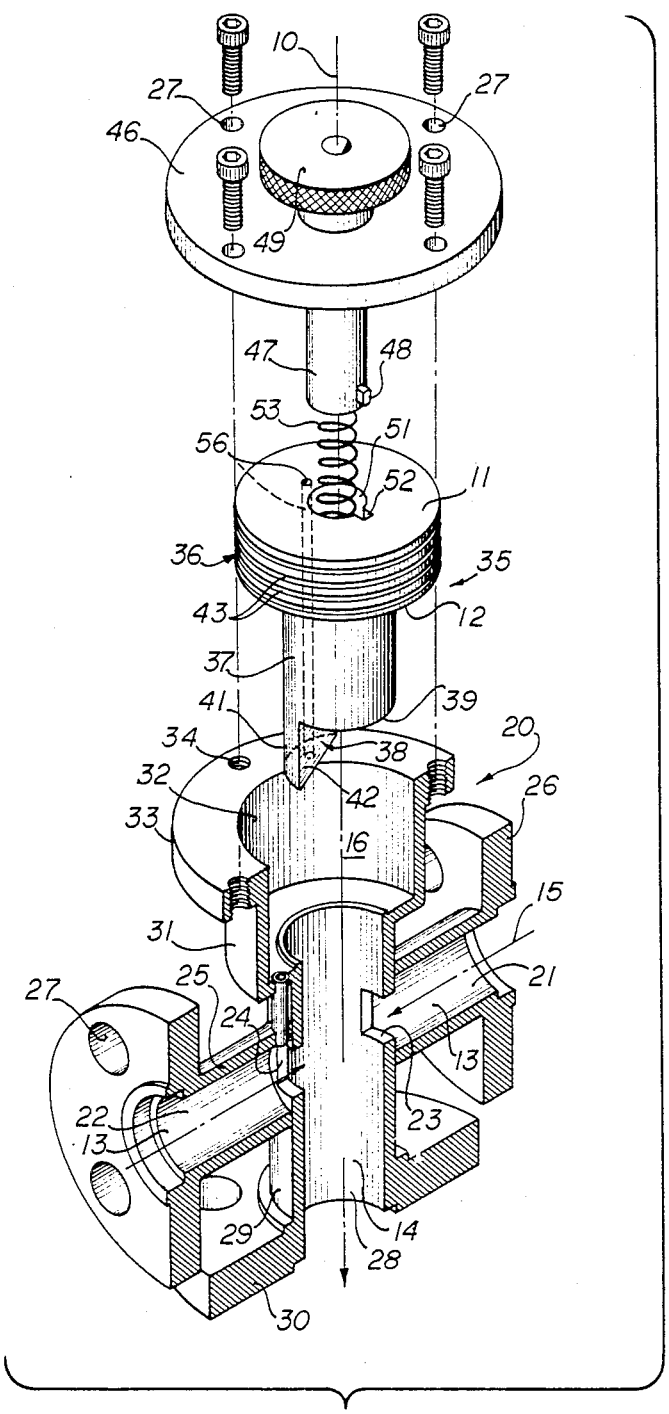
FIG. 1 is an exploded perspective view of the present invention in partial cross-section.
Figure 2:
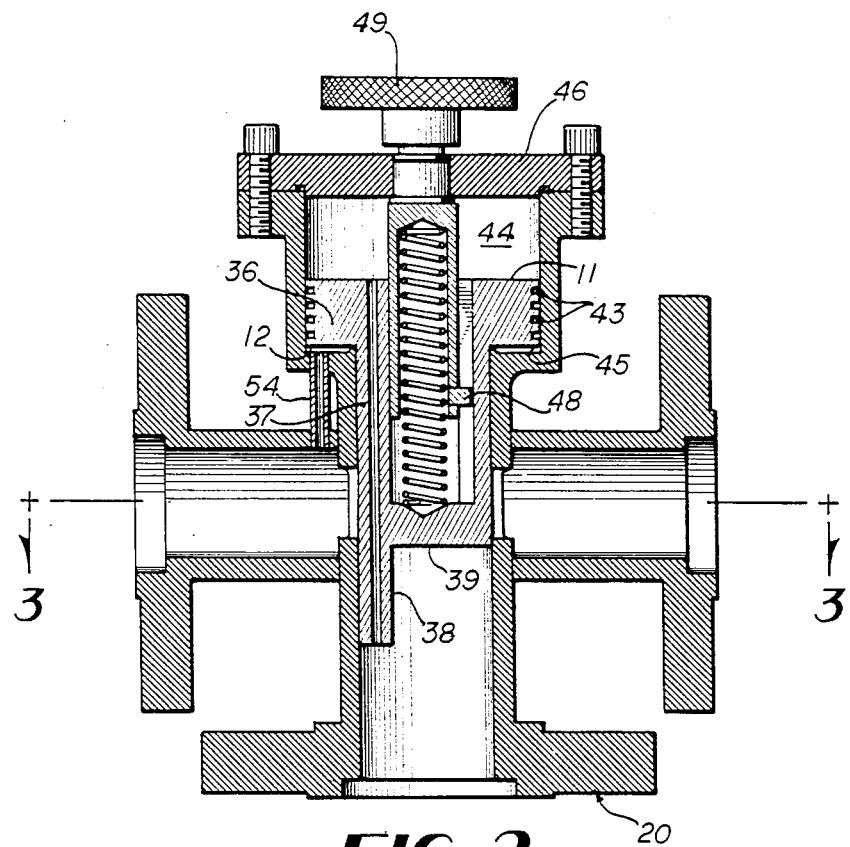
FIG. 2 is a cross-section depicting the piston assembly in a lowered position.
Figure 3:
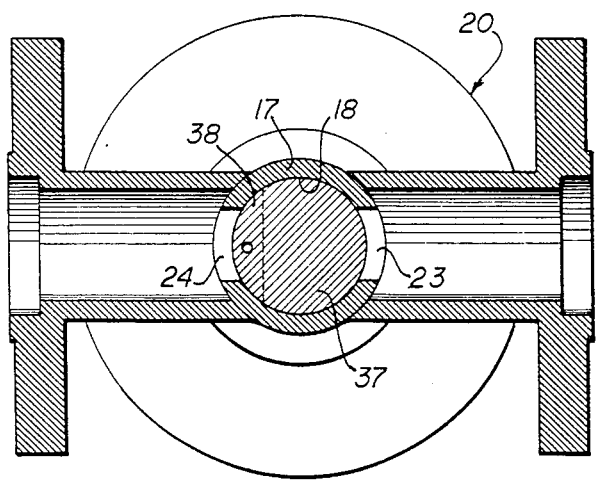
FIG. 3 is a cross-sectional view taken along lines 3—3 of FIG. 2.
Figure 4:
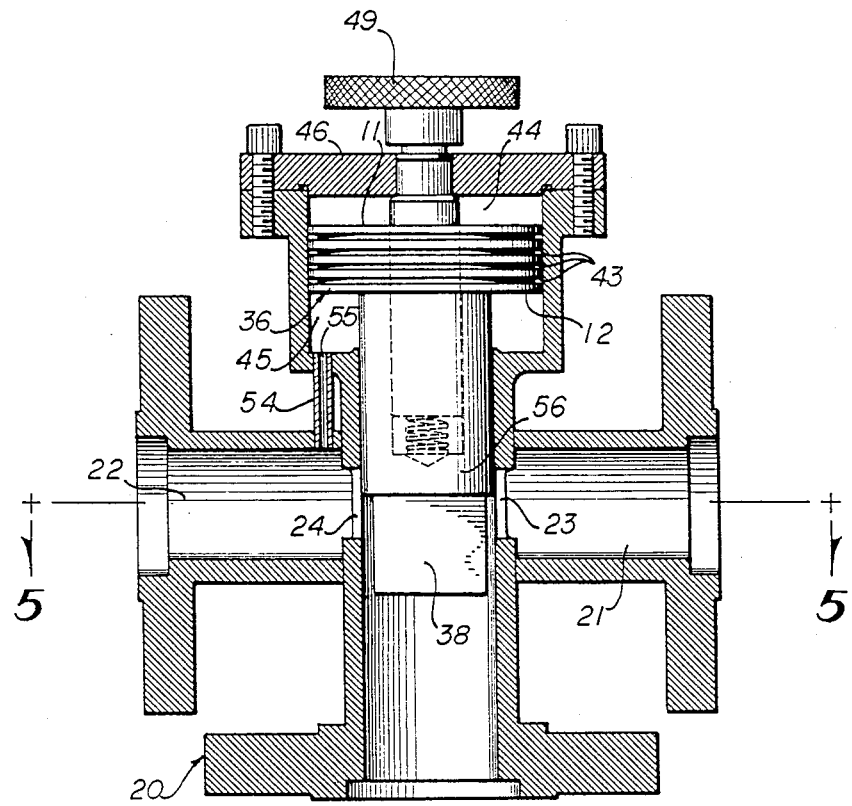
FIG. 4 is a cross-section.
Figure 5:
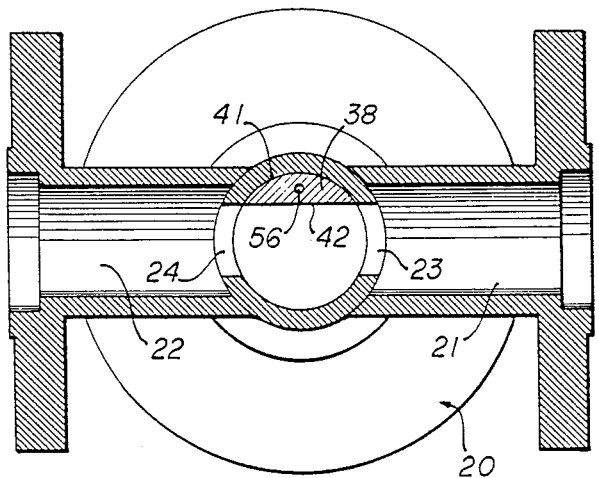
FIG. 5 is a cross-sectional view taken along lines 5—5 of FIG. 4.
Figure 6:
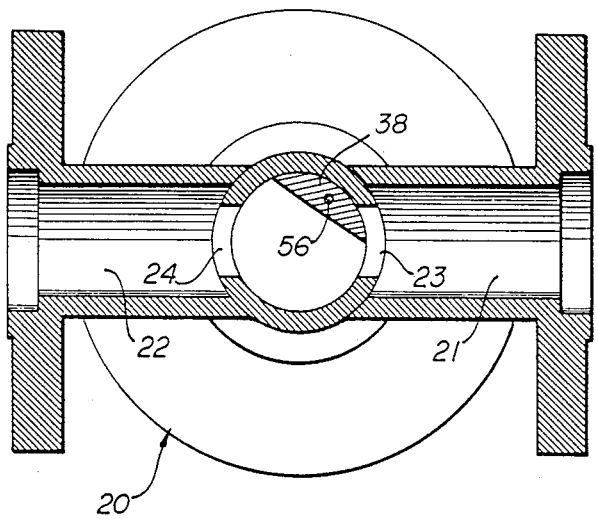
FIG. 6 is a cross-section similar to FIG. 5.

Referring in detail to the embodiments chosen for the purpose of illustrating the present invention, numeral 20 in FIG. 1 denotes generally a housing member which is cross-shaped. Housing member 20 having a vertical axis 10 defines an air inlet chamber 21 and a propane, or dominant gas, inlet chamber 22, which inlets 21 and 22 are defined by the interior circumferential walls 13 of arms 25. The inner surface of each inlet 21 and 22 has a respective, identical port 23 and 24. The inlets 21 and 22 and ports 23 and 24 are preferably aligned along horizontal axis 15, although the invention is operable with various alignments of inlets 21 and 22 and inlet ports 23 and 24. Each port 23 and 24 is preferably square-shaped, but can be of any other shape which would allow fluid flow from the ports 23 and 24 to be restricted, as later discussed. Each arm 25 has a flange 26 containing bores 27, through which bolts (not shown) pass to allow flanges 27 to be secured to corresponding flanges of inlet lines or pipes (not shown). Such securing of the flanges is generally known in the art, and numerous known methods can be utilized. Housing member 20 also includes arm 29 having interior circumferential wall 14 that defines cylindrical mixing chamber, or lower housing 28. Arm 29 includes flange 30, similar to flanges 26, which includes bores 27 and is secured to a corresponding flange on an outlet line (not shown) by bolting or other, commonly known suitable means. Housing 20 member also includes arm or upper housing 31 having an interior circumferential wall 16 which defines cylindrical piston chamber 32. Disposed between and joining upper housing 31 and mixing chamber or lower housing 28 is annular collar 17. Collar 17 defines inner surface 18. Cap flange 33 on upper housing 31 includes internally threaded bores 34. Slidably received in piston chamber 32 is a piston assembly denoted generally by the numeral 35. Piston assembly 35 includes cylindrical piston head 36, cylindrical piston stem 37 and gate 38. Piston assembly 35 is slidably received in cylindrical piston chamber 32, and piston stem 37 thereby extends into cylindrical mixing chamber 28 to a distance so that foot 39 of piston stem 37 extends slightly below the lower periphery of ports 23 and 24 when piston assembly 35 is in its lowermost axial position, as shown in FIG. 2. While piston stem 37 slides axially within housing member 20, stem 37 is also received into mixing chamber 28 so that both ports 23 and 24 are effectively closed off when piston assembly 35 is in its lowermost axial position. Gate 38 is immovably attached to piston stem 37 at its lowermost portion or foot 39. Gate 38 is arcuate shaped, with a circumferential, cylindrical outer surface 41 concentric with the outer surface or circumference of piston stem 37, and a flat or axially extending inner surface 42, the edge of which forms a chord of side 41, as shown in FIG. 5. Since side 41 of gate 38 follows the circumference of piston stem 37, gate 38 will close off either of ports 23 or 24 when gate 38 is disposed adjacent to ports 23 and 24. The shape of gate 38 is such that by properly positioning piston assembly 35, gate 38 can be disposed on either side of and between ports 23 and 24 so as not to restrict either of ports 23 and 24 when piston assembly 35 is in the proper position along axis 10. For example, FIG. 5 depicts gate 38 in a position which permits unrestricted fluid flow from both ports 23 and 24, respectively. Likewise, gate 38 can be disposed so as to incrementally close off or restrict either of ports 23 and 24. FIG. 6 depicts gate 38 turned slightly clockwise from its position shown in FIG. 5, so that gate 38 partially restricts fluid flow through port 23. Of course, for gate 38 to restrict either of ports 23 or 24, piston assembly 35 must be disposed axially in a position so that gate 38 is adjacent to ports 23 and 24, an example of which is shown in FIG. 4. FIG. 2 shows stem 37 and gate 38 (in phantom lines) rotated so as to completely close off port 24, provided gate 38 is in the proper axial position, as discussed above.

The head 36 of piston assembly 35 includes parallel, spaced channels 43, which together form a labyrinth seal to essentially prevent the communication of fluids in second or upper chamber 44 and first or lower chamber 45. This type of seal is commonly known and utilized in applications which employ a piston. The head 36 of piston assembly 35 is larger than piston stem 37, as depicted in FIG. 1. Piston head 36 is received in piston chamber 32 in close tolerance, but still easily moves axially. Piston head 36 includes a radially disposed, flat upper surface 11 and a radially disposed flat lower surface 12. Piston stem 37 is attached to and concentrically disposed in relation to piston head 36 as shown in FIGS. 1 and 4. Piston head 36 divides piston chamber 32 into upper chamber 44 and lower chamber 45 as shown in FIG. 4. Consequently, when piston assembly 35 moves upward, or toward cap flange 33, the area of upper chamber 44 decreases and the area of lower chamber 45 increases. When piston assembly 35 moves downwardly, or toward ports 23 and 24, the area of upper chamber 44 increases and the area of lower chamber 45 decreases.

Housing cap 46 journals actuator 47 having two ends, and which includes key 48 attached to its lower circumference. The opposite end of actuator 47 is fixedly secured to knob 49, so that actuator 47 is rotated by turning knob 49 either clockwise or counterclockwise. Cap 46 also includes bores 27 arranged adjacent to its circumference and passing through cap 46 as shown in FIG. 1. Cap 46 is mounted to cap flange 33 of housing member 20 by passing threaded bolts 50 through bores 27 of cap 46 and into internally threaded bores 34 of cap flange 33. Other commonly known methods of mounting may also be employed, as earlier described.

As shown in FIG. 2, when cap 46 is mounted onto flange 33, actuator 47 extends into piston channel 51 of piston assembly 35, so that key 48 is axially received into guide 52. In operation, therefore, piston assembly 35 will move axially along longitudinal axis 10 of actuator 47 but cannot rotate about longitudinal axis 10 without the rotation of actuator 47 because of the presence of key 48 in guide 52. Extending from the lower end of actuator 47 is a resilient means or spring 53 which also is received into piston channel 51. Spring 53 acts as a damper to inhibit unrestricted, upper axial movement of piston assembly 35. Because actuator 47 is received in channel 51 of piston assembly 35 and is smaller in cross-sectional area than piston stem 37, the upper surface 11 of piston head 36 which is exposed to upper chamber 44 is greater than the lower surface 12 of piston head 36 which is exposed to lower chamber 45.

Tube 54 defining passageway 55 connects the dominant gas inlet 22 to lower chamber 45, thus essentially equalizing the relative gas pressures in inlet 22 and lower chamber 45. Passageway 56 extends through and is defined by piston assembly 35 along its longitudinal axis, including through piston head 36, stem 37, and gate 38, so that when piston assembly 35 is received in housing member 20, passageway 56 connects mixing chamber 28 and upper chamber 44. Thus, the relative gas pressures in upper chamber 44 and in mixing chamber 28 are essentially equalized.

In operation, the amount of mixed gas delivered to the mixing chamber 28 and therefore to the user is determined by the axial position of piston assembly 35 relative to ports 23 and 24. As discussed earlier, the gas pressures in inlets 21 and 22 are regulated so that they are equal. When a user initiates gas demand, the pressure in mixing chamber 28 will drop causing a corresponding pressure drop in passageway 56 and also in upper chamber 44. When the pressure in upper chamber 44 drops sufficiently so that the force exerted thereby onto upper surface 11 of piston head 36 exposed to upper chamber 44 is less than the force exerted onto lower surface 12 of head 36 exposed to lower chamber 45, piston assembly 35 will be caused to move upward, allowing more flow through ports 23 and 24, and into mixing chamber 28.

This phenomenon continues until piston assembly 35 stabilizes within a small range of axial movement. In practice, piston assembly 35 will not remain at a truely fixed axial position, but will be adjusted by the relative pressures in chambers 44 and 45, respectively, upward or downward within a small range of axial movement. The fluid flow through mixing chamber 28 will remain essentially constant, however, within the required parameters necessary for the application of the invention.

Spring 53 is not designed to itself control the axial position of piston assembly 35 but is only intended to dampen the upward movement of piston assembly 35 should the pressure in upper chamber 44 drop quickly and significantly. Should the demand again increase, the pressure in upper chamber 44 will again decrease, likewise causing piston assembly 35 to move upward, exposing more of the outlet ports 23 and 24 and allowing more gasses to enter mixing chamber 28. When demand decreases, the pressure in upper chamber 44 will increase relative to the pressure in lower piston chamber 45, causing the axial position of piston assembly 35 to lower, closing off portions of ports 23 and 24, respectively. Thus, demand for gas controlled by the user controls the amount of mixed gas delivered by the piston operated mixer.

The ratio of the gasses delivered is controlled by rotating piston assembly 35 so that gate 38 partially covers either port 23 or port 24. In the present embodiment chosen for illustration, this is done by manually turning knob 49, which causes actuator 47 to turn. Since key 48 is engaged in guide 52, piston assembly 35 turns along with and to the same degree as knob 49. Thus, gate 38, which is fixed to piston stem 37, may be manually, selectively adjusted to control the mixed gas ratio.

Figure 7:
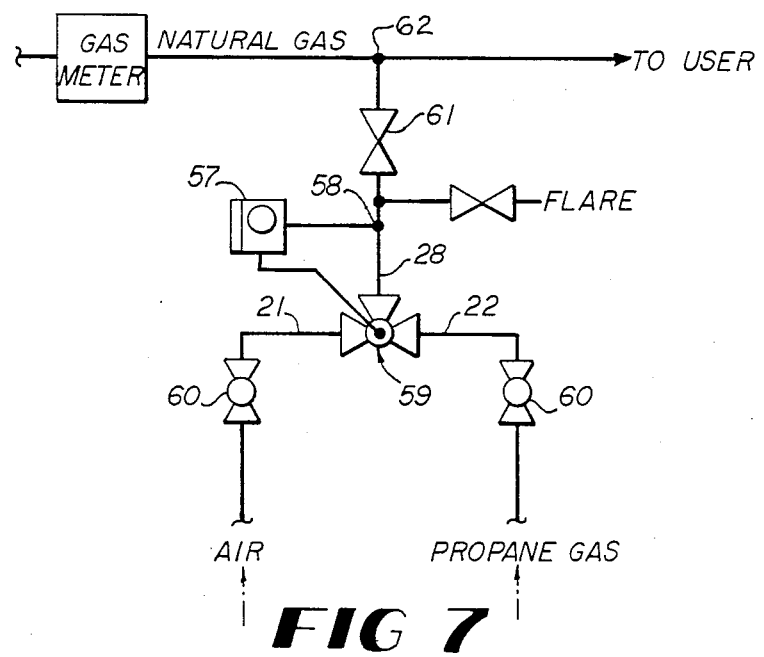
FIG. 7 is a schematic of the present invention.

In another embodiment, an apparatus such as solid state controller, commonly known in the art, is attached to actuator 47 in place of knob 49 to automatically rotate, or turn, piston assembly 35, as described earlier. FIG. 7 shows in schematic illustration easily understood by those skilled in the art, the preferred incorporation of the present invention with natural gas service to a user. As discussed earlier, when natural gas service to a user is interrupted, the user can switch from natural gas service to a propane/oxygen mixture by valve 62, which valve 62 can be of any type of three-way valves commonly known in the art. The propane/oxygen mixture is accomplished by combining these gases in the piston operated mixer 59. The pressure of the inlet compressed air and the pressure of the inlet propane gas are controlled by regulators 60, so as to be identical. The compressed air and propane gas pass through their respective regulators 60 and into the piston operated mixer 59 through either inlets 21 or 22, as the case may be. The mixed gas is then delivered through lower housing, outlet or mixing chamber 28. Controller 57 attached to the piston operated mixer 59 receives an electric signal from a BTU measuring device 58 such as a gavitometer, calorimeter or a Wobbe Index Meter, which samples the mixed gas on the outlet side of the piston operated mixer 59. These measuring devices, as is controller 57, are quite well known in the art and are not further described in detail here. The measuring device 58 samples the mixed gas, determines the BTU content thereof and sends an electrical signal (commonly in the 4 to 20 milliamp range) to controller 57. Controller 57 then automatically adjusts the rotation of piston assembly 35 to affect the desired mixed gas ratio. This, in turn, directly affects the BTU content of the mixed gas. Therefore, the BTU content of the mixed gas can be controlled easily and efficiently. The gas then passes through valves 61 and 62 to the user.

What is claimed is:

1. An apparatus for mixing fluids, comprising:
   a. a housing member having a pair of inlet chambers and a mixing chamber;
   b. two inlet ports defined by said housing member, whereby one of said inlet ports is disposed between each of said inlet chambers and said mixing chamber so that said inlet chambers communicate with said mixing chamber;
   c. a piston chamber disposed in coaxial relationship to said mixing chamber;
   d. a piston assembly disposed in said piston chamber and said mixing chamber whereby said piston chamber is divided into a first chamber and a second chamber;
   e. a first passageway connecting one of said inlet chambers and said first piston chamber;
   f. a second passageway connecting said mixing chamber and said second chamber; and
   g. actuating means journaled by said housing for rotating said piston assembly.

2. The apparatus defined in claim 1, whereby said piston assembly is comprised of a piston head, a piston stem attached to said piston head, and a gate attached to said piston stem.

3. The apparatus defined in claim 1, whereby said actuating means is telescopically received into said piston assembly.

4. The apparatus defined in claim 1, and resilient means for damping the axial movement of said piston assembly.

5. The apparatus defined in claim 4, whereby said resilient means is attached to said actuating means.

6. An apparatus for mixing fluids comprising:
(a) a housing member having a pair of inlet chambers;
(b) a mixing chamber disposed between said inlet chambers and a cylindrical piston chamber disposed in coaxial relationship along a common axis with said mixing chamber, said mixing chamber and said piston chamber communicating with each other;
(c) a pair of inlet ports defined by said housing member, each inlet port being disposed between said mixing chamber and said inlet chambers, whereby said inlet chambers communicate with said mixing chamber;
(d) a piston head disposed in said piston chamber, for separating said piston chamber into an upper chamber and a lower chamber, said piston head being movable axially within said piston chamber and being rotatable within said piston chamber;
(e) a cylindrical piston stem fixedly attached to said piston head, said piston stem being rotatable along with said piston head and being axially movable and having a free end whereby axial movement of said piston stem in one direction will progressively at least partially cover one or both of said inlet ports;
(f) a gate fixedly attached to said free end of said piston stem whereby the rotation of said piston stem can cause said gate to progressively at least partially cover up a portion of one of said inlet ports;
(g) said housing member having a first passageway from one of said inlet chambers to said lower chamber, allowing communication between said one inlet chamber and said lower chamber;
(h) a second passageway connecting said mixing chamber and said upper chamber, allowing communication between said mixing chamber and said upper chamber; and
(i) actuating means carried by said housing for rotating said piston head, said piston stem, and said gate.

7. The apparatus defined in claim 6, whereby said second passageway is within said piston gate, said piston stem and said piston head.

8. The apparatus defined in claim 6, wherein said piston head includes sealing means for preventing communication between said upper chamber and said lower chamber.

9. The apparatus defined in claim 8, wherein said sealing means comprises channels around the outside periphery of said piston head.

10. The apparatus defined in claim 6, including a resiliant means disposed between said piston head and said piston stem and said actuator for damping the axial movement of said piston head and said piston stem in one direction.

11. An apparatus for mixing fluids comprising:
(a) a housing having a cylindrical mixing chamber and a cylindrical piston chamber disposed in coaxial relationship along a common axis, said mixing chamber and said piston chamber communicating with each other, said piston chamber being of a larger diameter than said mixing chamber;
(b) a piston head disposed in said piston chamber for separating said piston chamber into a first piston chamber and a second piston chamber, said piston head being movable axially within said piston chamber and being rotatable within said piston chamber;
(c) a cylindrical piston stem connected to one side of said piston head and protruding therefrom into said mixing chamber, said piston stem being received in and being rotatable in said mixing chamber, said piston stem being movable axially with said piston head, said stem being of a length sufficient to effectively separate said mixing chamber and said piston chamber in all positions of said piston head within said piston chamber, said piston piston stem having an end terminating within said mixing chamber; a pair of inlet ports disposed adjacent to said mixing chamber, whereby axial movement of said piston stem in one direction within said mixing chamber will progressively at least partially cover one or both of said inlet ports;
(d) said housing having a pair of inlets for respectively containing two fluids under pressure, said inlet ports communicating with said mixing chamber and respectively with said inlets for introducing said fluids from said inlets into said mixing chamber;
(e) said housing having a first passageway for providing communication between one of said fluid inlets and said first piston chamber;
(f) a second passageway for providing communication between said mixing chamber and said second piston chamber;
(g) a gate protruding from said piston stem for progressively covering and uncovering at least a portion of said inlet ports when said piston stem is rotated; and
(h) means carried by said housing for rotating said piston head and said piston stem and said gate.

12. The apparatus defined in claim 11, wherein said means includes a control member rotatably carried by said housing, said control member being coaxially and telescopically received in said piston head for rotating said piston head and said stem and said gate about said axis.

13. The process of progressively mixing fluids delivered in pipes to a mixing zone where the mixed fluids are withdrawn and thereby vary the pressure on the mixed fluids and for varying the mix of said fluids, comprising:
(a) continuously applying the pressure of one of said fluids to one side of a piston head and the fluid pressure in said mixing zone to the other side of said piston head for maintaining said piston head in a prescribed position when the pressure differential between the respective pressures remains constant and for moving said piston head in one direction along an axis when the pressure differential increases and in the other direction along said axis when the pressure differential decreases;
(b) feeding said fluids respectively through circumferentially spaced ports in a cylindrical housing defining said mixing zone;
(c) rotating said piston head for moving a piston stem and a gate member element on said piston stem in an orbital path along the inside periphery of said housing for selectively and progressively closing or opening one of said ports and closing or opening another port, and moving said stem having an end disposed radially across it in an axial direction in response to movement of said piston head;

(d) progressively moving the end portion of said stem between a closed position and an open position over said ports.

14. An apparatus for mixing fluids, comprising:
(a) a housing member having an upper housing and a lower housing; said upper housing having a cylindrical upper inner wall defining a piston chamber; said lower housing having a cylindrical lower inner wall defining a fluid mixing chamber; said upper inner wall and said lower inner wall being coaxially disposed along a longitudinal axis;
(b) said housing member also having an annular collar joining one end of said upper housing to one end of said lower housing, said collar having an inner surface extending radially between one end portion of said upper inner wall and one end portion of said lower inner wall;
(c) a cylindrical piston head carried within said piston chamber, said piston head being moveable axially within said piston chamber and being rotatable therein;
(d) a cap on said upper housing, said cap extending over and closing the upper end portion of said piston chamber;
(e) a rotatable actuator extending through said cap and engaging said piston head for rotating said piston head about said axis;
(f) a piston stem secured by one end to the central portion of said piston head for movement therewith, said piston stem extending downwardly from said piston head into the upper portion of said mixing chamber, said piston head being of substantially the same diameter as said inner upper wall, said piston stem being of a diameter substantially the same as said lower cylindrical wall whereby said piston head and said piston stem are simultaneously rotated, within their respective chambers and are moveable axially therein, said piston stem being of a length that a lower portion of said piston stem remains within said mixing chamber when said piston head has been moved to its full extent toward said cap, the lower end of said piston stem having a radially extending lower surface, a gate member extending downwardly from said lower end of said piston stem, said gate member having a cylindrical outer peripheral surface which is concentric with the outer surface of said piston stem so that when said piston head and piston stem are rotated, the outer surface of said gate member passes along the periphery of said lower wall, said annular collar defining ports circumferentially spaced from each and each being in the path of rotation of said gate member, said gate member having an axially extending inner surface which is spaced from said axis so that said gate member occupies less than half the cross-sectional area of said mixing chamber, a pair of inlet chambers respectively communicating with said ports, said ports being selectively progressively closeable by said gate member upon rotation of said piston head and said piston stem, said piston stem being of a length such that when said piston head and piston stem are moved from their uppermost position downwardly, they progressively pass downwardly for progressively closing said ports;
(g) a passaway from one of said inlet chambers to a portion of said piston chamber, and a passageway between another portion of said piston chamber and said mixing chamber.

15. The process of mixing fluids using a piston assembly disposed within a housing, the housing having at least two inlets and a mixing chamber, comprising:
(a) discharging fluids from the inlets into the mixing chamber for producing mixed fluids in said mixing chamber;
(b) rotating the piston assembly to dispose a portion of the piston assembly over one or both of said inlets for regulating the ratio of the respective fluids discharged to said mixing chamber;
(c) adjusting the axial position of the piston assembly by applying presure of one fluid against said piston assembly to move said piston assembly in one axial direction and applying the pressure of the mixed fluids against said piston assembly to move said piston assembly in the other axial direction to thereby regulate the quantity of the fluids delivered to the mixing chamber; and
(d) discharging the mixed fluids from the mixing chamber.

16. Process for mixing fluids comprising:
(a) disposing a piston with port closing gate protruding from the piston, in a housing having a mixing chamber as a portion of the housing;
(b) progressively introducing a first fluid under pressure through a port in said housing and then into said mixing chamber;
(c) progressively introducing a second fluid under pressure through a second port in said housing and then into said mixing chamber for progressively commingling with said first fluid;
(d) moving said piston in an axial direction in said housing for causing portions of said piston to progressively cover or uncover said ports for regulating the volume of fluid delivered through said ports to said mixing chamber;
(e) rotating said piston in said housing for progressively radially moving said port closing gate of said piston to cover or uncover said ports for varying the ratio of the amount of said first fluid to the amount of said second fluid; and
(f) applying the pressure of said first fluid against said piston for moving said piston axially in one direction in said housing and applying pressure of the commingled fluid to said piston for moving said piston axially in the other direction in said housing.

* * * * *